United States Patent

[11] 3,628,619

[72] Inventors Kenzo Tanaka
  Hamamatsu-shi;
  Fujihiko Tomita, Iwata-gun, Shizuoka-ken, both of Japan
[21] Appl. No. 881,263
[22] Filed Dec. 1, 1969
[45] Patented Dec. 21, 1971
[73] Assignee Yamaha Hatsudoki Kabushiki Kaisha
  Shizuoka-ken, Japan
[32] Priority Dec. 2, 1968
[33] Japan
[31] 43/104348

[54] TRANSMISSION DEVICE FOR A MINIATURE SNOW ENDLESS-TRACK VEHICLE
  11 Claims, 3 Drawing Figs.
[52] U.S. Cl. .................................................. 180/9.64,
  74/730, 74/722, 74/645
[51] Int. Cl. ...................................................... B62d 55/00,
  F16h 47/00, F16h 37/00
[50] Field of Search ............................................ 74/730,
  731, 655, 242.13; 180/5, 9.64

[56] References Cited
UNITED STATES PATENTS

| | | | |
|---|---|---|---|
| 2,776,018 | 1/1957 | Lundquist .................... | 180/9.64 |
| 3,023,824 | 3/1962 | Bombardier ................. | 180/9.64 |
| 2,983,164 | 5/1961 | Herndon et al. .............. | 74/731 |
| 3,006,199 | 10/1961 | Christenson et al. ......... | 74/730 X |
| 3,173,311 | 3/1965 | Seliber ........................... | 74/731 |
| 3,360,998 | 1/1968 | Griffel ............................ | 74/730 UX |
| 3,446,095 | 5/1969 | Bookout ......................... | 74/730 X |

*Primary Examiner*—Arthur T. McKeon
*Attorney*—Irving M. Weiner

ABSTRACT: A transmission device involves a belt-driven pulley for receiving engine power. Said pulley is disposed close to a chain casing for covering a transmission chain-drive, and rotatably mounted on a hollow cylindrical shaft which extends from the side wall of said chain casing and through which extends a driving shaft fitted with the sprocket wheel of said chain-drive. A hydraulic torque converter for transmitting power from said pulley to said latter shaft is positioned on the opposite side of said pulley to the chain casing.

TRANSMISSION DEVICE FOR A MINIATURE SNOW ENDLESS-TRACK VEHICLE

BACKGROUND OF THE INVENTION

This invention relates to a transmission device for a miniature snow vehicle provided with a hydraulic torque converter.

In the design of a miniature snow endless-track vehicle, it is impossible due to the narrow width of the vehicle body to permit the driving shaft of a hydraulic torque converter to be connected in tandem to the power takeoff shaft of a vehicle engine. In addition, if an engine should be replaced by one having a different characteristic, it will be unsuitable for the same (vehicle) torque converter to be used with the latter, unless it is properly modified in design to assure the optimum operation of a snow vehicle. Accordingly, it is always necessary to use such type of torque converter as exactly matches the engine and the size of said snow vehicle.

SUMMARY OF THE INVENTION

The object of this invention is to provide a transmission device for a miniature snow endless-track vehicle so improved as to permit any hydraulic torque converter to be fitted with a single vehicle engine in a high effective condition and to be arranged in a short or compact form with respect to the transverse direction of a vehicle body.

DETAILED DESCRIPTION OF THE INVENTION

Figure 1:
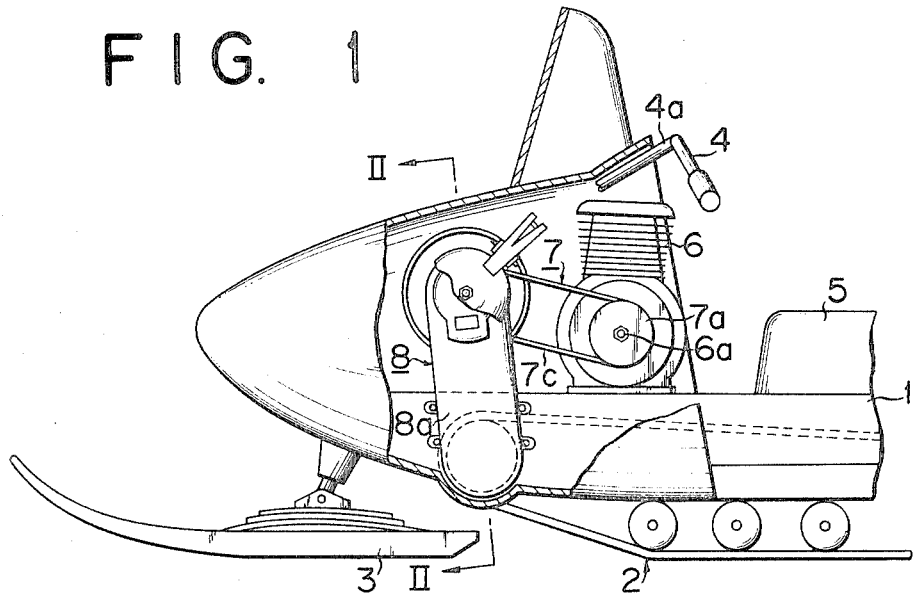
FIG. 1 is a side view of a miniature snow vehicle provided with a transmission device embodying this invention, partly broken away.
Figure 3:
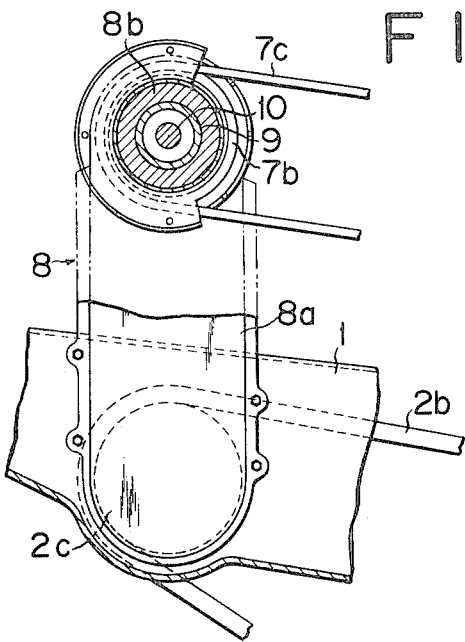
FIG. 3 is an enlarged side view of said transmission device, partly broken away.
Figure 2:
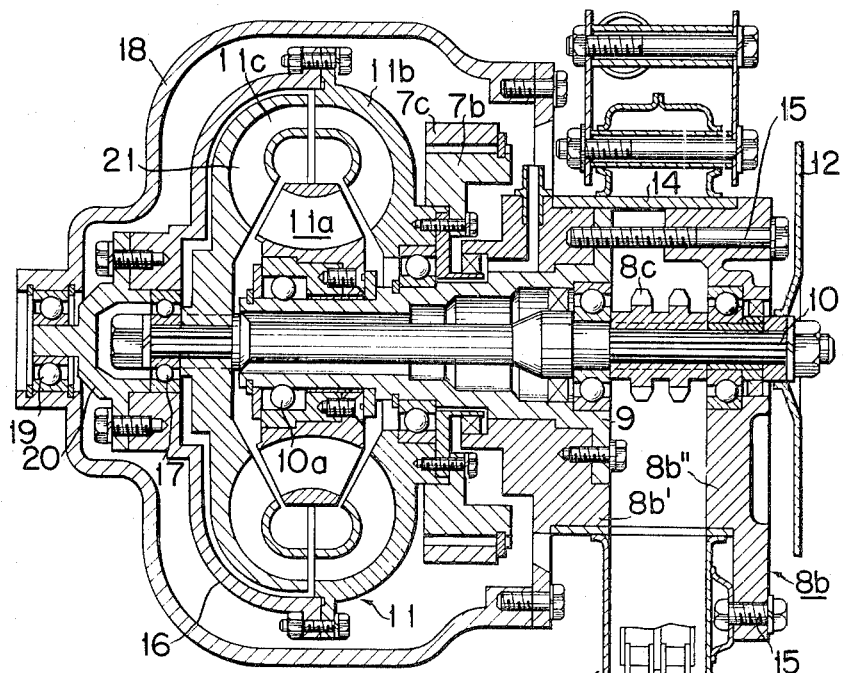
FIG. 2 is an enlarged cross-sectional view of said transmission device taken along a line II—II of FIG. 1.
Figure 2:
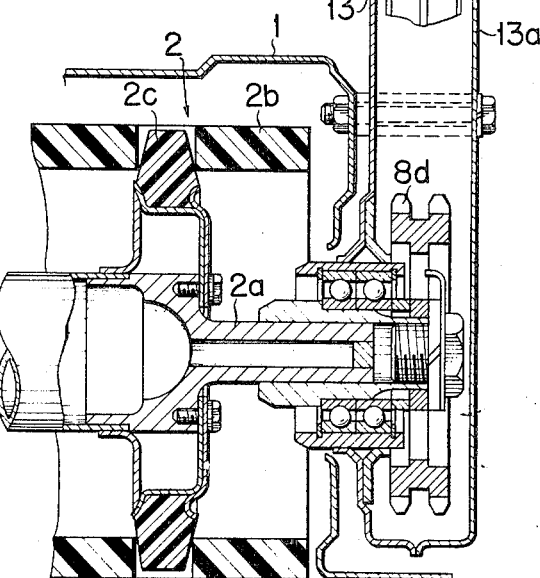

FIG. 1 indicates a miniature snow endless-track vehicle. Said snow vehicle comprises a vehicle body 1, an endless-belt traction means 2, a pair of skis 3 disposed at the front end of said vehicle body, a handle bar 4 connected with a steering column 4a for controlling said skis 3, a long saddle-shaped seat 5 mounted on said vehicle body 1, and a vehicle engine 6 disposed on said vehicle body in front of said seat 5. The rotation of a driving shaft of the engine 6 is transmitted to the endless-belt traction means 2 via a belt-pulley transmission means 7 and a chain drive mechanism 8, both means 7 and 8 being involved in a transmission device of the present invention. Said belt-pulley transmission means 7 consists of a toothed driving pulley 7a attached to the power takeoff shaft 6a of said engine 6, a toothed driven pulley 7b for receiving engine power, and a toothed endless-belt 7c stretched over said pulleys 7a and 7b.

The transmission device of this invention further comprises a support member 8', which preferably comprises an upright tubular member or a box-shaped chain casing 8a and a bracket 8b, both attached to one sidewall of a vehicle body 1 and upwardly extending from the vehicle body 1, a hollow cylindrical shaft 9 attached to said support member 8' above said vehicle body 1 in parallel to the power takeoff shaft 6a which extends in the crosswise direction of said vehicle body 1, a countershaft 10 rotatably supported by said support member and extending through both outsides of said hollow cylindrical shaft 9, a hydraulic torque converter 11 supported on said hollow cylindrical shaft 9, and a shaft 2a for transmitting power necessary to drive an endless-track belt 2b of said endless-belt traction means 2. Said transmitting shaft 2a, which constitutes a part of said endless-belt traction means 2, is arranged in parallel to said countershaft 10 and partly extends into said chain casing 8a. Both end portions of said transmitting shaft 2a are journaled in bearings 12 mounted on both sides of said vehicle body 1.

Said chain casing 8a and bracket 8b are involved in said chain-drive mechanism 8, which further involves a driving sprocket wheel 8c secured to said countershaft 10, a driven sprocket wheel 8d secured to said power transmitting shaft 2a, and an endless sprocket chain 8e stretched over said sprocket wheels 8c and 8d.

Said box-shaped chain casing 8a covers said sprocket wheels 8c and 8d, and said endless sprocket chain 8e and said bracket 8b is disposed on the upper portion of said chain casing 8a and supports said hollow cylindrical shaft 9. Thus the box-shaped chain casing 8a substantially constitutes a sole supporting means for the hydraulic torque converter 11. By said bracket 8b is rotatably supported said countershaft 10. Said bracket 8b is preferably attached to said chain casing 8a in such an adjustable manner that the distance defined by an interval between the axes of said sprocket wheels can be varied.

Said chain casing 8a consists of a pair of channel-shaped casing members 13 and 13a coupled with their mutually attached peripheral edges, and a cylindrical member 14 inserted through mutually facing circular openings formed in the casing members 13 and 13a, respectively, so as to bridge those casing members. Splined on the other end of said countershaft 10 is a brake disc 12. For the adjustable attachment of said bracket 8b to said chain casing 8a, said bracket 8b preferably comprises a pair of bracket sections 8b' and 8b'' attached to both sides of said chain casing 8a respectively by means of set bolts 15.

Said hydraulic torque converter 11 has a stator 11a supported on the free end portion of said hollow cylindrical shaft 9 rotatably in a direction in which said converter is normally driven, by means of an overrunning clutch 10a, an impeller 11b rotatably supported on a portion of said hollow cylindrical shaft 9 positioned nearer the support member 8' than that at which is disposed said stator 11a, and a turbine 11c attached to or splined on the end portion of said countershaft 10 extending from the free end of said hollow cylindrical shaft 9. To one side of said impeller 11b facing the support member 8' is attached said driven pulley 7b, so as to transmit power from the power takeoff shaft of said engine to the impeller 11b.

Said torque converter 11 further involves a member 16 for covering said turbine 11c, said covering member 16 being attached to said impeller and rotatably supported on the free end of said countershaft by means of ball bearings 17.

The transmission device further includes a converter housing 18 for covering said stator, impeller, turbine and covering member. Said converter housing 18 is supported by said bracket 8b, and rotatably supports said hydraulic torque converter ahead of the free end of said countershaft 10 via ball bearings 19 mounted on the neck portion of a cap member 20 attached to the end of said covering member 16, so that the countershaft 10 is trilaterally supported.

In operation, when the driven pulley 7b is driven, its rotation is transmitted to the impeller 11b so that the turbine 11c is rotated at a delayed velocity due to the action of the fluid passing through the passage 21 which is formed throughout the impeller, turbine and stator. As a result, the countershaft 10 receives the rotating moment of the engine via the belt-transmission device 7 and torque converter 11.

In this case, it is possible to render said converter fully compact with respect to the axial direction of said countershaft 10, because the toothed driven pulley 7b is arranged between the converter 11 and chain casing 8a with its side portion attached to the impeller casing, and the revolution of said toothed driven pulley 7b is so adjusted by defining the diameters of the driving and driven pulleys 7a and 7b in the selected ratio as to drive the converter in the best condition.

Furthermore, the driving shaft is bilaterally supported, while the converter and driven pulley 7b are supported only by the chain casing 8a, with the result that the converter can be fully driven without the eccentric rotation which would be unavoidably produced due to an open side supporting of a driving shaft.

What we claim is:

1. A transmission device for a miniature snow endless-track vehicle including a vehicle body with endless traction means, a vehicle engine mounted on said body with its power takeoff shaft extending in the crosswise direction of said vehicle body, in which said device comprises a support member having its lower end attached to one side portion of said vehicle body and upwardly extending from said body portion, a hollow cylindrical shaft attached to said support member in a manner to extend parallel to said power takeoff shaft, a countershaft rotatably supported by said support member and extending through said hollow cylindrical shaft, a hydraulic torque converter supported on said hollow cylindrical shaft, said hydraulic torque converter having a stator supported on the free end portion of said hollow cylindrical shaft rotatably in a direction in which said converter is normally driven, an impeller rotatably supported on a portion of said hollow cylindrical shaft and positioned nearer the support member than that at which is positioned said stator, and a turbine attached to the end portion of said countershaft extending from the free end of said hollow cylindrical shaft, a driving sprocket wheel secured to said countershaft, a driven sprocket wheel secured to a driving shaft of said endless traction means, an endless sprocket chain stretched over said sprocket wheels, and transmission means for connecting the power takeoff shaft of said engine to said impeller so as to transmit the rotation of said power takeoff shaft to said impeller.

2. A transmission device for a miniature snow endless-track vehicle claimed in claim 1 in which said support member consists of a box-shaped chain casing attached to one sidewall of said vehicle body for covering said sprocket wheels and sprocket chain, and a bracket which is disposed on the upper portion of said chain casing so as to support said hollow cylindrical shaft and rotatably said countershaft.

3. A transmission device for a miniature snow endless-track vehicle claimed in claim 2 in which said torque converter includes a member for covering said turbine said covering member being attached to said impeller and rotatably supported on the free end of said countershaft.

4. A transmission device for a miniature snow endless-track vehicle claimed in claim 3 in which there is a converter housing for covering said stator, impeller, turbine and covering member, said housing being supported by said bracket and rotatably supporting said hydraulic torque converter ahead of the free end of said countershaft.

5. A transmission device for a miniature snow endless-track vehicle claimed in claim 2 in which said bracket is adjustably attached to said chain casing in such a manner that the distance defined by an interval between the axes of said sprocket wheels is varied.

6. A transmission device for a miniature snow endless-track vehicle claimed in claim 1 in which said transmission means consists of a driving pulley attached to said power takeoff shaft of the vehicle engine, a driven pulley attached to one side of said impeller facing the support member, and an endless belt stretched over said pulleys.

7. A transmission device for a miniature snow endless-track vehicle claimed in claim 2 in which said bracket comprises a pair of bracket sections attached to both sides of said chain casings respectively.

8. A transmission device for a miniature snow endless-track vehicle claimed in claim 4 in which said bracket comprises a pair of bracket sections attached to both sides of said chain casing respectively, and is adjustably attached to said chain casing in such a manner that the distance defined by an interval between the axes of said sprocket wheels can be varied.

9. A transmission device for a miniature snow endless-track vehicle claimed in claim 8 in which said transmission means consists of a driving pulley attached to said power takeoff shaft of said vehicle engine, a driven pulley attached to one side of said impeller facing the support member, and an endless belt stretched over said pulleys.

10. In a tractor snow vehicle having an endless driven track,
a horizontal side frame member,
an elongate upright tubular supporting member affixed to said frame member and extending upwardly therefrom, a
an endless track driving sprocket having a driving shaft journaled on and extending into said upright tubular supporting member,
a transmission mounted on said upright tubular supporting member laterally thereof and above said sprocket, said transmission having a driven shaft extending into said upright tubular supporting member,
and an endless driven member connecting said shafts within said upright tubular supporting member.

11. In a tractor snow vehicle as defined by claim 11, wherein said transmission includes a housing extending laterally through and mounted solely on said upright tubular supporting member.

* * * * *